United States Patent [19]

Thelen

[11] Patent Number: 4,726,690
[45] Date of Patent: Feb. 23, 1988

[54] BALANCING MACHINE BEARING SUPPORT

[75] Inventor: Dieter Thelen, Modautal, Fed. Rep. of Germany

[73] Assignee: Carl Schenck, AG, Fed. Rep. of Germany

[21] Appl. No.: 833,619

[22] Filed: Feb. 26, 1986

[30] Foreign Application Priority Data

Feb. 27, 1985 [EP] European Pat. Off. ........ 85102119.6

[51] Int. Cl.$^4$ .............................................. G01M 1/04
[52] U.S. Cl. ...................................... 384/99; 73/473; 73/477; 384/247
[58] Field of Search ................. 73/473, 474, 476, 477; 384/448, 493, 535, 549, 557, 558, 581, 247, 99

[56] References Cited

U.S. PATENT DOCUMENTS

| | | | |
|---|---|---|---|
| 1,429,606 | 9/1922 | Marsland | 384/549 |
| 2,434,661 | 1/1948 | Krueger | 384/549 X |
| 2,785,572 | 3/1957 | Bokorney | 73/477 X |
| 2,857,764 | 10/1958 | Frank | 73/477 X |
| 4,406,164 | 9/1983 | Hines et al. | 73/476 |
| 4,445,373 | 5/1984 | Mueller | 73/477 X |

FOREIGN PATENT DOCUMENTS

| | | |
|---|---|---|
| 938338 | 1/1956 | Fed. Rep. of Germany . |
| 2453292 | 5/1976 | Fed. Rep. of Germany . |
| 2727080 | 12/1978 | Fed. Rep. of Germany . |
| 2854838 | 7/1980 | Fed. Rep. of Germany . |
| 987864 | 3/1965 | United Kingdom ................ 73/477 |
| 1276341 | 6/1972 | United Kingdom ................ 73/477 |

Primary Examiner—Daniel P. Stodola
Attorney, Agent, or Firm—Connolly and Hutz

[57] ABSTRACT

In a method of supporting the bearing of a bearing support structure during balancing of a rotor, the bearing and the rotor journal in the bearing are permitted to rotate about the vertical, and transverse axes of the rotor journal. A spring arrangement is positioned between the bearing and vibration transducers for transferring unbalance information from the rotor being investigated to the vibration transducers. The spring arrangement allows the bearing and rotor journal to move without hindrance about the vertical, and transverse axes, such movement being caused from misalignment of the rotor journals with the axis of rotation of the rotor. Coulomb's friction is thereby eliminated for the purpose of avoiding excessively high constraining forces, spring realignment forces and frication forces.

13 Claims, 5 Drawing Figures

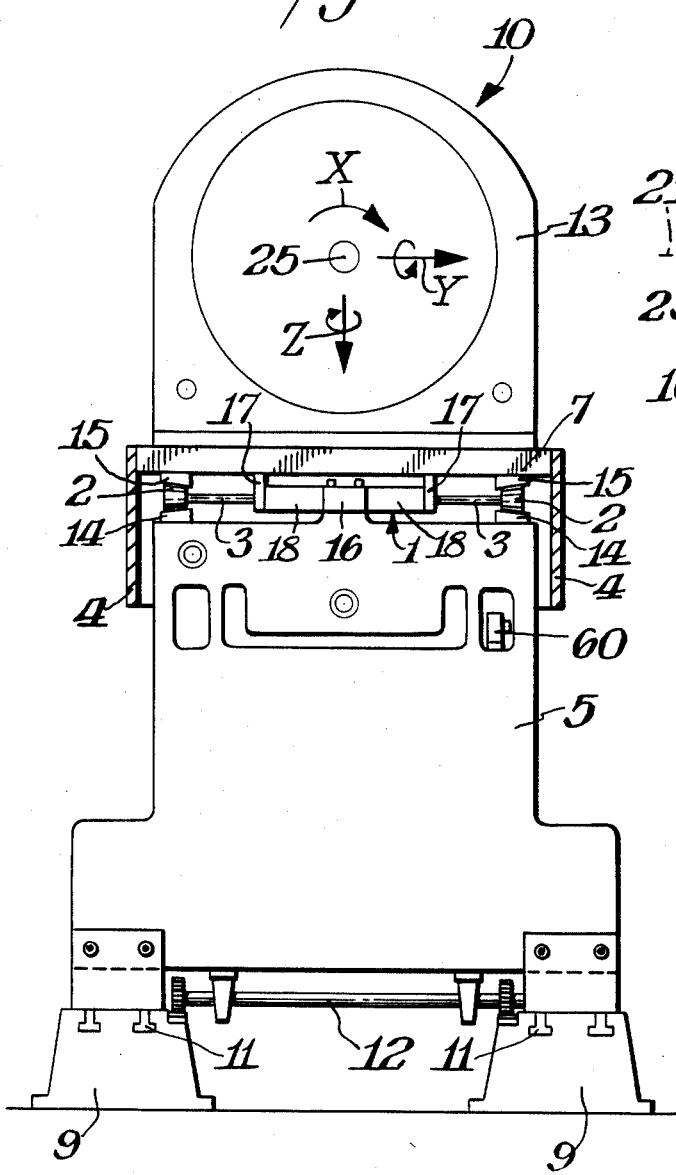
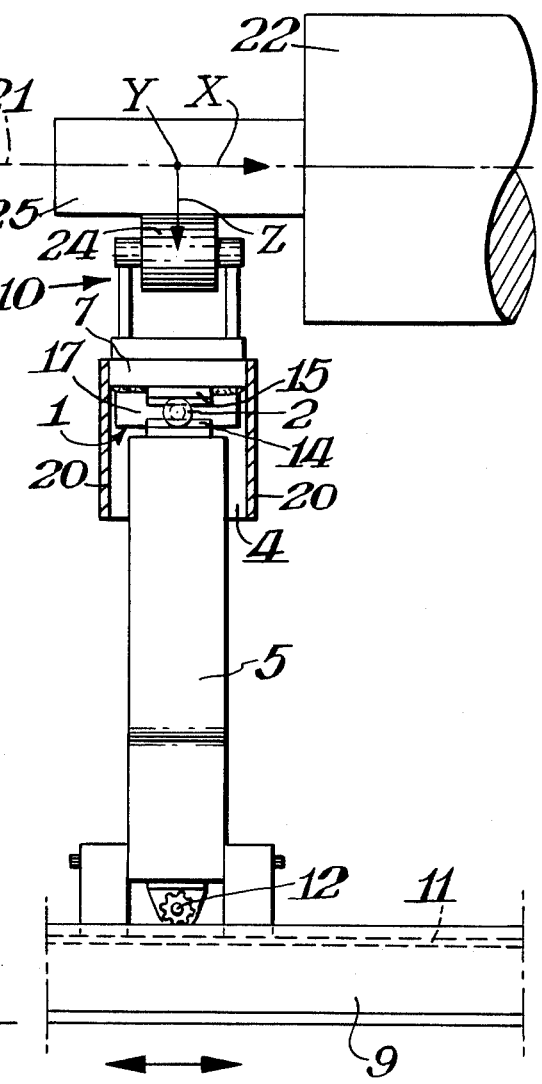
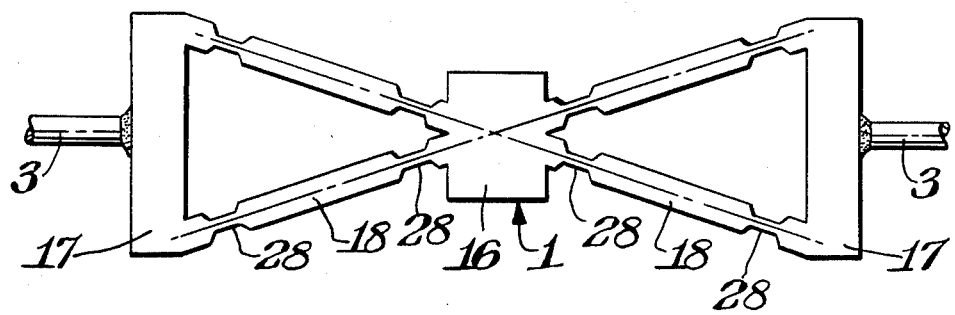

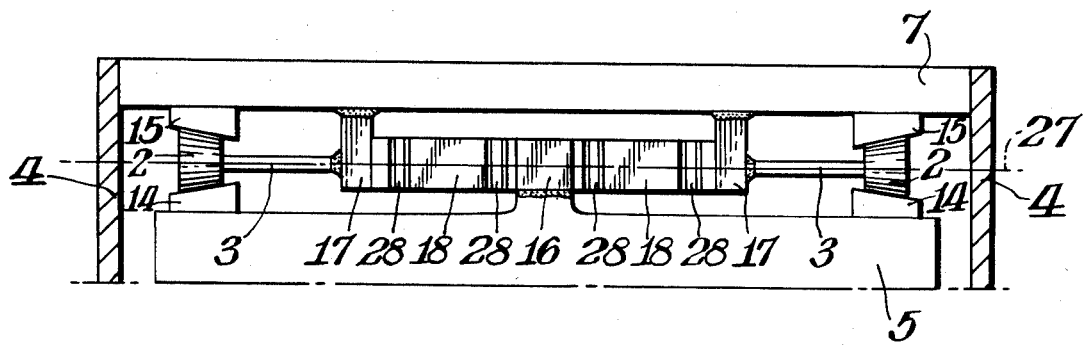
Fig. 3a.
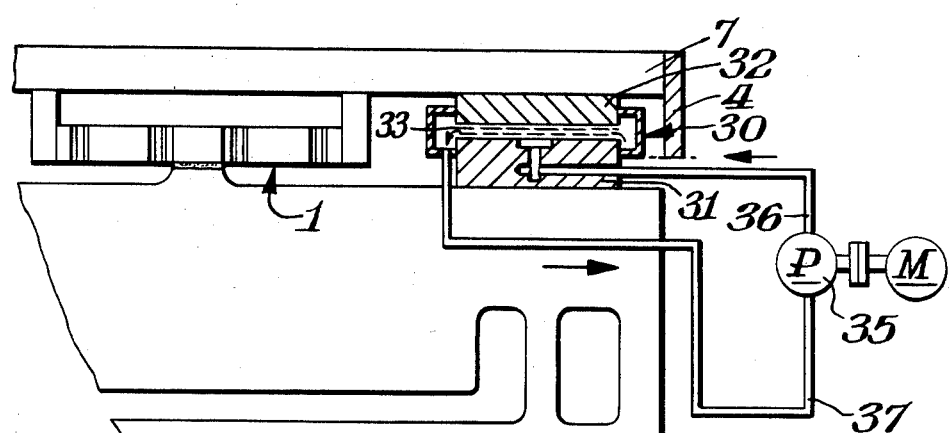
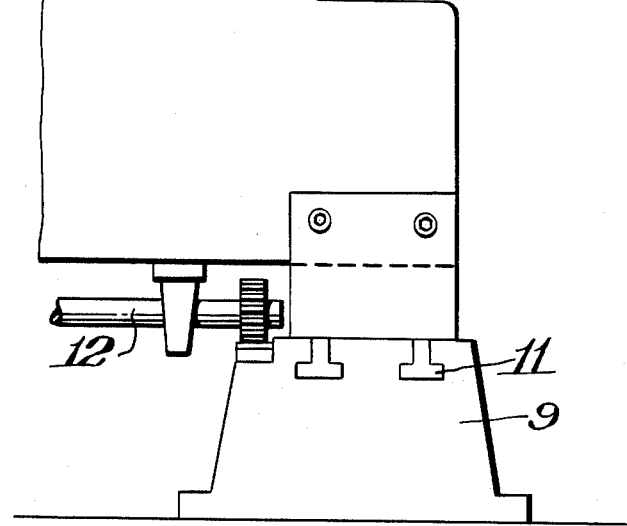
Fig. 4.

BALANCING MACHINE BEARING SUPPORT

BACKGROUND OF THE INVENTION

The present invention relates to supporting the journal of a rotor during balancing thereof, and wherein the journal is permitted to move along the vertical, transverse and shaft axes of the rotor journal.

Through DE-PS No. 938 338 a bearing arrangement, in particular a rotor support arrangement, for testing rotors in balancing machines has become known, with one or several rolling element bearings that carry the shaft support bearing. The arrangement includes spring support of the rolling element bearings. With such an arrangement it is possible for the bearing arrangement to accommodate rotor deflections. Because of the vertical and transverse axial freedom of the bearing, conditions must be fulfilled which lead to an involved design in view of the necessarily high spring rate and in view of the fact that no constraining forces must occur which falsify the measurement. Sliding friction, however, is not considered. Also space requirements are considerable due to design height.

SUMMARY OF THE INVENTION

With this as background, the present invention is based on a method and apparatus wherein the spring support of a bearing functions with minimal space requirement to avoid excessively high constraining forces, spring realignment forces and friction forces, especially in those cases where the axes of the rotor journals of the rotor being investigated for unbalance are not in line with its axis of rotation.

These objectives are solved through several distinguishing features. By avoiding Coulomb friction during rotation of the bearing as a result of permitted motion of the journal about vertical and transverse axes, practically no falsifying spring realignment forces occur. A spring arrangement is positioned between a journal bearing and a dynamometer, and the spring arrangement transmits unbalance information of the rotor being investigated to vibration transducers. The unbalance information is efficiently transmitted even in those cases where the axes of the rotor journals are not aligned with the axis of rotation of the rotor. Because the spring that is arranged between the dynamometer of the balancing machine and the bearing of the balancing machine which carries the rotor journal is made from one piece, movements around the vertical axis and around the transverse axis are possible with negligible constraint and without the respective movements influencing each other. Through the support elements arranged in the transverse axis, the total weight of the spring-bearing arrangement and part of the weight of the rotor is transferred to the support structure of the balancing machine without falsifying influences upon the measurement.

A modification according to the invention herein provides for a hydrostatic bearing arrangement as a support element through which Coulomb's friction is avoided. In another modification tapered rollers are used as support elements which roll upon tapered counter surfaces.

A further modification consists of spring supported bearings for the rotor being balanced and the arrangement thereof on a stiff plate wherein the stiff plate is connected by means of the spring arrangement with the dynamometric of the balancing machine to which the vibration sensors are attached. The vibration sensors or transducers may be of the force, displacement, velocity, or acceleration measuring type.

In another embodiment of the invention tapered rollers are located in the vertical bearing middle plane while their axes are in the horizontal plane.

The spring arrangement is distinguished by its compactness and single piece construction. Tapered rollers are positioned outwardly of the main body of the spring arrangement and guide rods connect the rollers to the body. Elastic spokes of the spring arrangement make possible a reaction-free movement caused by non-aligned rotor journals.

In order to increase the stiffness of the plate which supports the bearing, downwardly extending skirts may be connected to the plate. Welding may be used between the bearing and the plate to prevent the friction effects associated with bolt connections.

The complete spring arrangement including guide rods and tapered rollers may be made of one piece construction. Also, when a hydrostatic bearing is used, portions thereof may be integral with the cover plate.

In order to make possible the transmission of unbalance forces emanating from the rotor, without falsification as a result of a tilt of the journal axis to the axis of rotation of the rotor, a one-piece construction of the bearing plate, the spring arrangement and the dynamometer part of the balancing machine may be used.

With a balancing machine according to the invention having a spring support arrangement for each bearing, i.e. generally two bearings per rotor, practically error-free investigation of the unbalance condition of the rotor occurs in those cases of suspected tilt of the axes of the rotor journal with respect to the axis of rotation of the rotor.

BRIEF DESCRIPTION OF THE DRAWINGS

Novel features and advantages of the present invention in addition to those noted above will become apparent to those of ordinary skill in the art from a reading of the following detailed description in conjunction with the accompanying drawing wherein similar reference characters refer to similar parts and in which:

FIG. 1 is a front elevational view of the bearing support structure of a balancing machine for the investigation of a rotor, the structure including a spring arrangement, according to the present invention;

FIG. 2 is a side elevational view of the bearing support structure shown in FIG. 1 but illustrating a different bearing for the rotor journal;

FIG. 3 is a top plan view of a modification of the spring arrangement;

FIG. 3a is a fragmental side elevational view showing the spring support arrangement attached between the bearing base plate and dynamometer; and FIG. 4 is an alternate arrangement showing a hydrostatic bearing as a support element instead of the tapered rollers.

DETAILED DESCRIPTION OF THE INVENTION

Referring in more particularity to the drawing, a foundation 9 is provided for the bearing support structures 10 of a balancing machine. The dynamometer 5 of the machine transmits the unbalance information to at least one vibration sensor 60 and it is fastened to foundation 9 by means of bolts. To accommodate various rotors, the bearing support structures 10 at opposite ends of the machine are movable toward and away from each other on the foundation 9 via the track 11 by means of drive 12. The dynamometer 5 supports the spring support arrangement 1 which includes the transversely extending tapered rollers 2 as support elements between the base plate 7 of the bearing support 10. In the embodiment shown in FIG. 1, a plain bearing 13 is attached and fastened with bolts to base plate 7. The plain bearing 13 serves the purpose of receiving the journal 25 of the rotor 22 to be investigated.

It is, however, also possible, instead of connecting the bearing 13 to the base plate, to connect the lower part of the plain bearing 13 directly to the spring arrangement 1. Tapered rollers 2 are connected to spring arrangement 1 by means of guide rods 3. The tapered rollers 2 are located between the tapered supports 14,15 which are arranged on the dynamometer 5 and the base plate 7. The tips of the cones formed by extensions of the tapered rollers 2 and the tapered roller supports 14,15 meet in the vertical axis Z.

The central area 16 of the spring arrangement 1 is fastened by means of bolts to the dynamometer 5. Alternatively, this connection can be accomplished by welding. The outer end pieces 17 of the spring arrangement 1 are solidly connected to base plate 7. It is also possible, however, to reverse the connection such that the central area 16 is connected to the base plate 7 and the outer end pieces 17 are connected to dynamometer 5. Here again instead of screw-like fasteners welding may be used. Spokes 18 are provided between the central area 16 and the outer end pieces 17 of the spring arrangement. Preferably, the spokes 18 comprise a one piece construction together with the central area 16 and the outer end pieces 17. Reduced sections of the spokes 18 function to reduce the already minimal constraining forces that occur.

FIG. 2 illustrates an arrangement similar to FIG. 1 except that a roller bearing 24 is used as an alternative to the plain bearing 13 shown in FIG. 1.

If a movement of bearing 13 or roller bearing 24 occurs, which movement is the result of misalignment of the rotor journal with respect to the axis of rotation of the rotor, an additional apparent unbalance would be transmitted to dynamometer 5 caused by the rotation of the journal if there were no spring support of the bearing. As a result of the inventive spring arrangement 1 the bearing can adapt to the mechanical inaccuracies around the vertical axis Z of the bearing support structure and around the transverse axis Y of the bearing support structure 10, so that practically no falsifying additional forces or additional moments are transmitted to dynamometer 5. The weight of bearing 13 is transmitted by the tapered rollers 2 to the foundation and the proportional weight of the rotor associated with the bearing support structure is also transmitted to the foundation.

Skirts 4 are provided to stiffen the base plate 7. These skirts are preferably welded to the base plate 7 and also serve to protect the spring arrangement 1 together with the tapered rollers 2 and rods 3 connected thereto. The tapered rollers 2 each have a horizontal axis of rotation and these rollers are positioned to the right and left of the vertical axis Z. The rollers Z accommodate the movement around the vertical axis and transfer the weight of the bearing and the proportional weight of the rotor to the foundation 9. When a hydrostatic bearing 30 of the type shown in FIG. 4 is used instead of the tapered roller bearing, the skirts 4 serve as protection for this bearing arrangement as well.

Side view FIG. 2 of the bearing support structure 10 shows a further pair of skirts 20 arranged transverse to the axis of rotation 21 of a rotor 22. Skirts 20 are fixed to base plate 7. Moreover, skirts 22 and 4 are welded together in the corners where they abut one another.

As noted above, FIG. 2 shows a roller bearing 24 as an alternative to plain bearing 13. One of the two bearing journals 25 of the rotor 22 is supported by the roller bearing. For clarity, only one bearing support structure 10 with journal 25 is shown.

The bearing support structure 10 may, as already shown in FIG. 2, be moved on the foundation by means of the straight tracks and the drive 12 in the direction indicated by the double arrow.

FIG. 3 shows the spring arrangement in top plan view. From the central area spokes 18 extend in an essentially horizontal direction to the outer end pieces 17. Hereby the spring arrangement 1 is made in the simplest form by cutting it out of flat stock. In this case the central area 16, the spokes 18, and the outer ends 17 have the same thickness in vertical direction and are formed from a single sheet of material. Various thicknesses of the spring arrangement in the horizontal direction may be selected depending upon the intended purpose, so that rotational movements around the vertical axis caused by misalignments of the bearing journals 25 will be received practically reaction free without falsifying the result of the unbalance measurement. The reduced sections of the spokes 18 are of special advantage in this respect.

Instead of cutting or otherwise forming the spring arrangement 1 from flat stock a cast version is also possible in which case the central area 16 and the outer ends 17 may be heavier in vertical as well as in horizontal direction when compared to the spokes 18.

FIG. 3a is a view of the spring arrangement 1 wherein thinner spokes 18 extend symmetrically to the middle plane 27 of the spring arrangement 1. FIG. 3a just as in FIG. 3 reduced sections are provided, in order to reduce reactions which are caused by twisting of the bearing with respect to the vertical axis Z and transverse axis Y as a result of misalignment of the rotor journal while simultaneously maintaining high rigidity of the bearing support structure in the Y, X and Z directions. This is important since the unbalance force, the axial force on the rotor, and the weight of the rotor must be received by the bearing support structure. The X-direction represents the axis of the rotation of the rotor.

FIG. 3 also shows how a one piece construction of the spring arrangement including base plate 7 and dynamometer 5 can be achieved by means of welding or also as a casting. In this case it may be assumed that the outer region 17 is welded to the base plate 7, whereby the central area 16 has a lesser vertical height above the middle plane 27, while the central area below the middle plane 27 is welded directly to a raised portion of the dynamometer. In this case the guide rods 3, which are already equipped with tapered rollers 2, are also welded to the outer ends 17 of the spring arrangement 1.

FIG. 4 shows a hydrostatic bearing 30 that can be used instead of the tapered roller 2, the guide rods 3, and the tapered supports 14,15. In this case a fluid, either liquid or gas, flows under pressure through holes in the bottom plate 31 and against cover plate 32. The bottom plate 31 is connected to the dynamometer 5 and the cover plate is connected to the base plate 7. Also a reversal of this arrangement may be used. The fluid which escapes under pressure lifts the cover plate 32 including base plate 7 away from the bottom plate 31 so that a fluid film develops between bottom plate 31 and cover plate 32. On this fluid film 33, the base plate 7 can cover without hindrance in the X, Y and Z directions from the influences of misalignment of the rotor journals, without Coulomb friction occurring on this interface. At the same time the fluid film 33 transfer the proportional rotor weight and the total weight of the spring supported bearing to the foundation of the balancing machine.

A pump 35 for increasing pressure supplies fluid through line 36 to the holes in the bottom plate and via return line 37 the discharged fluid film 33 is carried back to the pressure increasing pump 35. It is understandable that two hydrostatic bearings 30 according to FIG. 4 are used per bearing support structure 10. One or more pressure increasing pumps may be used with this arrangement.

What is claimed:

1. A balancing machine bearing support structure for use in determining the unbalance of a rotor having a journal at at least one end thereof comprising bearing means for supporting the journal of a rotor being investigated, a dynamometer for receiving rotor unbalance information, bearing support means for supporting the bearing means positioned between the bearing means and dynamometer, and a spring arrangement connected between the bearing means and the dynamometer in a manner that permits slight rotation of the bearing means and rotor journal of a rotor being investigated about a vertical axis and a transverse axis to thereby compensate for those rotors being investigated having a journal axis not in alignment with the axis of rotation of the rotor and thereby eliminate the alverse effects thereof on unbalance determination, the spring arrangement including a central portion connected to one of the dynamometer and the bearing means and transversely outward portions connected to the other of the bearing means and dynamometer, the spring arrangement further including outwardly extending spokes connected between the central and transversely outward portions thereof, and the bearing support means including transversely outwardly positioned tapered rollers between the bearing means and dynamometer, transverse guide rods connecting the tapered rollers to the spring arrangement, and tapered supports on the bearing means and dynamometer complementing the tapered rollers and in engagement therewith.

2. A balancing machine bearing support structure as in claim 1 wherein the tapered rollers and tapered supports have surfaces that converge in the direction of the spring arrangement.

3. A balancing machine bearing support structure as in claim 1 wherein the bearing means supporting the journal of a rotor being investigated includes a rigid plate and the spring arrangement is connected to the plate of the bearing means.

4. A balancing machine bearing support structure as in claim 1 wherein the bearing means supporting the journal of a rotor being investigated includes a rigid plate and the spring arrangement is connected to the plate of the bearing means, and wherein the tapered supports are on the rigid plate of the bearing means.

5. A balancing machine bearing support structure as in claim 4 wherein the rigid plate of bearing means includes downwardly extending skirt portions at the periphery of the plate.

6. A balancing machine bearing support structure as in claim 1 wherein each transverse guide rod and its associated tapered roller comprise a one piece construction.

7. A balancing machine bearing support structure as in claim 1 wherein the spokes include sectionally reduced portions along the length thereof.

8. A balancing machine bearing support structure as in claim 1 wherein the spring arrangement comprises a one piece construction.

9. A balancing machine bearing support structure for use in determining the unbalance of a rotor having a journal at at least one end thereof comprising bearing means for supporting the journal of a rotor being investigated, a dynamometer for receiving rotor unbalance information, bearing support means for supporting the bearing means positioned between the bearing means and dynamometer, a spring arrangement connected between the bearing means and the dynamometer in a manner that permits slight rotation of the bearing means and rotor journal of a rotor reing investigated about a vertical axis and a transverse axis to thereby compensate for those rotors being investigated having a journal axis not in alignment with the axis of rotation of the rotor and thereby eliminate the adverse effects thereof on unbalance determination, the spring arrangement including a central portion connected to the one of the dynamometer and the bearing means and transversely outward portions connected to the other of the bearing means and dynamometer, the spring arrangement further including outwardly extending spokes connected between the central and transversely outward portions thereof, and the bearing support means including hydrostatic supports positioned transversely outwardly of the spring.

10. A balancing machine bearing support structure as in claim 9 wherein each hydrostatic support includes a pair of spaced apart plates, one connected to the bearing means and the other connected to the dynamometer, a plurality of openings in one of the plates, a pressure increasing pump, a feed line connecting the pressure side of the pump to the tube openings in the plate for supplying the space between the plates with fluid under pressure, and a return line connected to return spent fluid to the suction side of the pump.

11. A balancing machine bearing support structure as in claim 9 wherein the bearing means supporting the journal of a rotor being investigated includes a rigid plate and the spring arrangement is connected to the plate of the bearing means.

12. A balancing machine bearing support structure as in claim 9 wherein the spokes include sectionally reduced portions along the length thereof.

13. A balancing machine bearing support structure as in claim 9 wherein the spring arrangement comprises a one piece construction.

* * * * *